US012359822B2

(12) United States Patent
Ootani et al.

(10) Patent No.: US 12,359,822 B2
(45) Date of Patent: Jul. 15, 2025

(54) HEATING COOKING APPARATUS

(71) Applicant: SHARP KABUSHIKI KAISHA, Sakai (JP)

(72) Inventors: Tsuyoshi Ootani, Sakai (JP); Masahiro Nishijima, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 827 days.

(21) Appl. No.: 17/631,110

(22) PCT Filed: Jul. 27, 2020

(86) PCT No.: PCT/JP2020/028700
§ 371 (c)(1),
(2) Date: Jan. 28, 2022

(87) PCT Pub. No.: WO2021/020343
PCT Pub. Date: Feb. 4, 2021

(65) Prior Publication Data

US 2022/0205639 A1 Jun. 30, 2022

(30) Foreign Application Priority Data

Jul. 31, 2019 (JP) ................................ 2019-141451

(51) Int. Cl.
*F24C 7/02* (2006.01)
*F24C 15/02* (2006.01)
(Continued)

(52) U.S. Cl.
CPC ................ *F24C 7/02* (2013.01); *F24C 15/02* (2013.01); *F24C 15/16* (2013.01); *H05B 6/6402* (2013.01); *H05B 6/6414* (2013.01); *H05B 6/72* (2013.01)

(58) Field of Classification Search
CPC ........ F24C 15/02; F24C 15/16; F24C 15/162; F24C 7/02; H05B 6/6402; H05B 6/6414; H05B 6/72; H05B 6/725
(Continued)

(56) References Cited

U.S. PATENT DOCUMENTS 4,335,292 A * 6/1982 Tanaka ................ H05B 6/6411 D7/351
6,917,016 B2 7/2005 Backer et al.
(Continued)

FOREIGN PATENT DOCUMENTS

CN 203163010 U 8/2013
CN 103884030 A 6/2014
(Continued)

OTHER PUBLICATIONS

Third Party Observation concerning the International Application No. PCT/JP2020/028700 mailed on Jun. 28, 2021.

*Primary Examiner* — Quang T Van
(74) *Attorney, Agent, or Firm* — ScienBiziP, P.C.

(57) ABSTRACT

A heating cooking apparatus including a heating cooking chamber and a microwave supply unit is provided. An object to be heated is accommodated in the heating cooking chamber. A microwave supply unit includes a radiation port and supplies microwaves to the heating cooking chamber through the radiation port. The radiation port is positioned below the heating cooking chamber. The heating cooking apparatus further includes a partitioning member that covers the radiation port and a placing portion on which the object to be heated is placed.

5 Claims, 9 Drawing Sheets

(51) Int. Cl.
*F24C 15/16* (2006.01)
*H05B 6/64* (2006.01)
*H05B 6/72* (2006.01)

(58) Field of Classification Search
USPC ................ 219/681, 682, 688, 722, 752–762; 99/443 R, 399
See application file for complete search history.

(56) References Cited

U.S. PATENT DOCUMENTS

| | | | |
|---|---|---|---|
| 7,078,662 | B2 | 7/2006 | Yoshidome |
| 7,244,916 | B2 | 7/2007 | Iwamoto |
| 8,253,084 | B2 | 8/2012 | Toyoda et al. |
| 10,154,549 | B2 | 12/2018 | Nasu et al. |
| 2003/0218408 | A1 | 11/2003 | Backer et al. |
| 2005/0173426 | A1 | 8/2005 | Iwamoto |
| 2006/0016350 | A1 | 1/2006 | Yoshidome |
| 2007/0215608 | A1* | 9/2007 | Yoshino ................. H05B 6/704 219/681 |
| 2010/0133263 | A1 | 6/2010 | Toyoda et al. |
| 2010/0199965 | A1 | 8/2010 | Yoshidome |
| 2012/0187115 | A1 | 7/2012 | Toyoda et al. |
| 2012/0192725 | A1 | 8/2012 | Toyoda et al. |
| 2017/0171921 | A1 | 6/2017 | Nasu et al. |

FOREIGN PATENT DOCUMENTS

| | | | |
|---|---|---|---|
| FR | 2686400 | A1 | 7/1993 |
| GB | 2002210 | A | 2/1979 |
| JP | S56-029711 | U | 3/1981 |
| JP | H05-033941 | A | 2/1993 |
| JP | 2006038296 | A | 2/2006 |
| JP | 2006038300 | A | 2/2006 |
| JP | 2008257972 | A | * 10/2008 |
| JP | 2010-133634 | A | 6/2010 |
| JP | 2014-052152 | A | 3/2014 |

* cited by examiner

HEATING COOKING APPARATUS

TECHNICAL FIELD

The present invention relates to a heating cooking apparatus.

BACKGROUND ART

PTL 1 discloses a pull-out heating cooking apparatus. The pull-out heating cooking apparatus disclosed in PTL 1 includes a heating cooking apparatus main body and a pull-out body. The heating cooking apparatus main body includes a heating cooking chamber. The pull-out body can be drawn toward the outside of the heating cooking apparatus main body from a state where the pull-out body is accommodated in the heating cooking chamber.

Heating functions of the pull-out heating cooking apparatus disclosed in PTL 1 include a microwave heating function and a rapid hot air heating function. The microwave heating function is a function of applying microwaves toward an object to be heated. A microwave radiation port is formed in a side wall of the heating cooking chamber.

CITATION LIST

Patent Literature

PTL 1: JP 2010-133634 A

SUMMARY OF INVENTION

Technical Problem

Further, in recent years, there has been a demand for efficiently irradiating an object to be heated with microwaves.

In light of the above problem, an object of the present invention is to provide a heating cooking apparatus that can efficiently irradiate an object to be heated with microwaves.

Solution to Problem

A heating cooking apparatus of the present invention includes a heating cooking chamber and a microwave supply unit. An object to be heated is accommodated in the heating cooking chamber. The microwave supply unit includes a radiation port and supplies microwaves to the heating cooking chamber through the radiation port. The radiation port is positioned below the heating cooking chamber.

Advantageous Effects of Invention

According to the pull-out heating cooking apparatus of the present invention, an object to be heated can be efficiently irradiated with microwaves.

DESCRIPTION OF EMBODIMENTS

Figure 1:
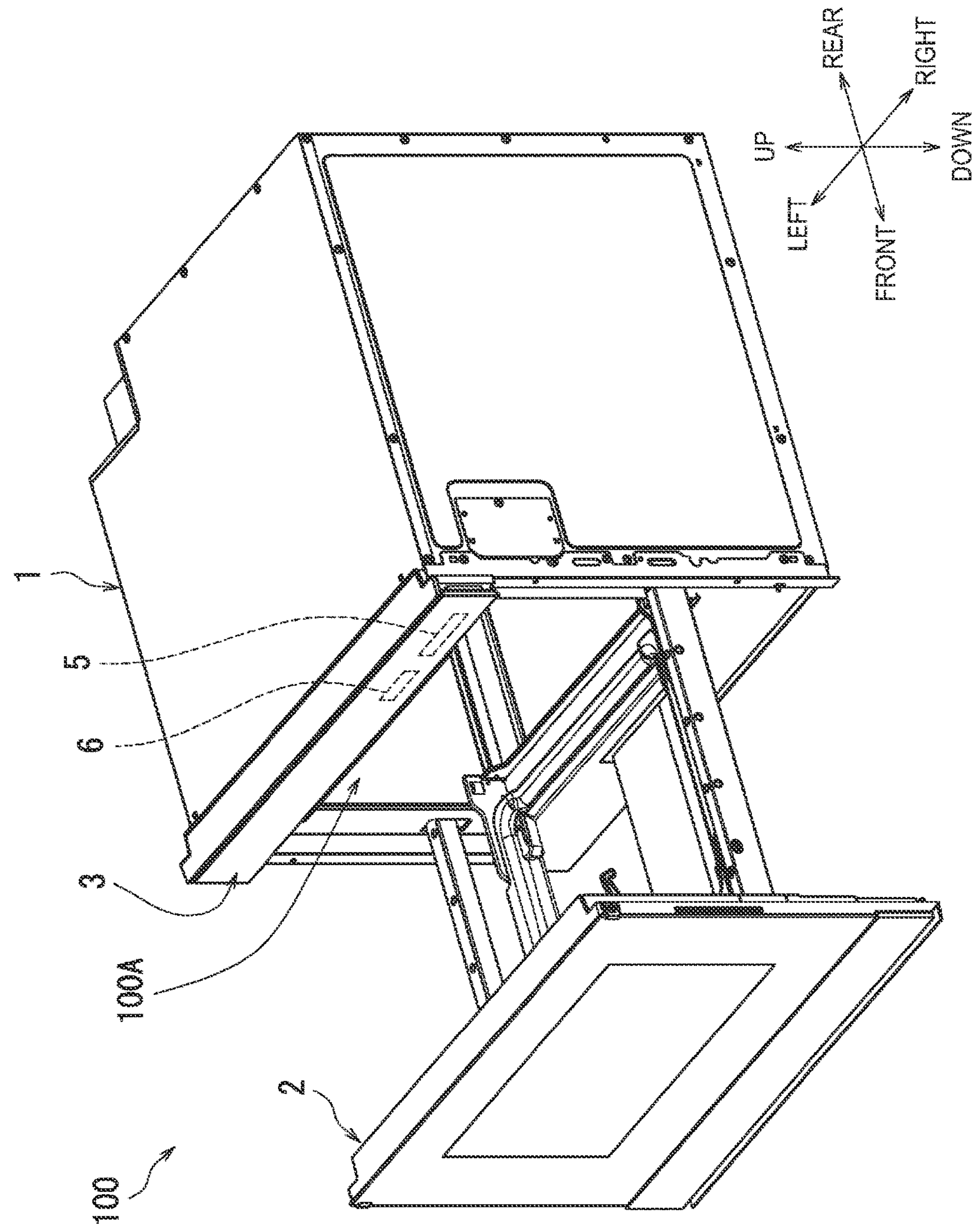
FIG. 1 is a perspective view illustrating an appearance of a pull-out heating cooking apparatus according to an embodiment of the present invention.

Hereinafter, an embodiment of a pull-out heating cooking apparatus according to the present invention will be described with reference to the drawings. In the drawings, the same or equivalent components are denoted by the same reference signs and description thereof will not be repeated.

Figure 2:
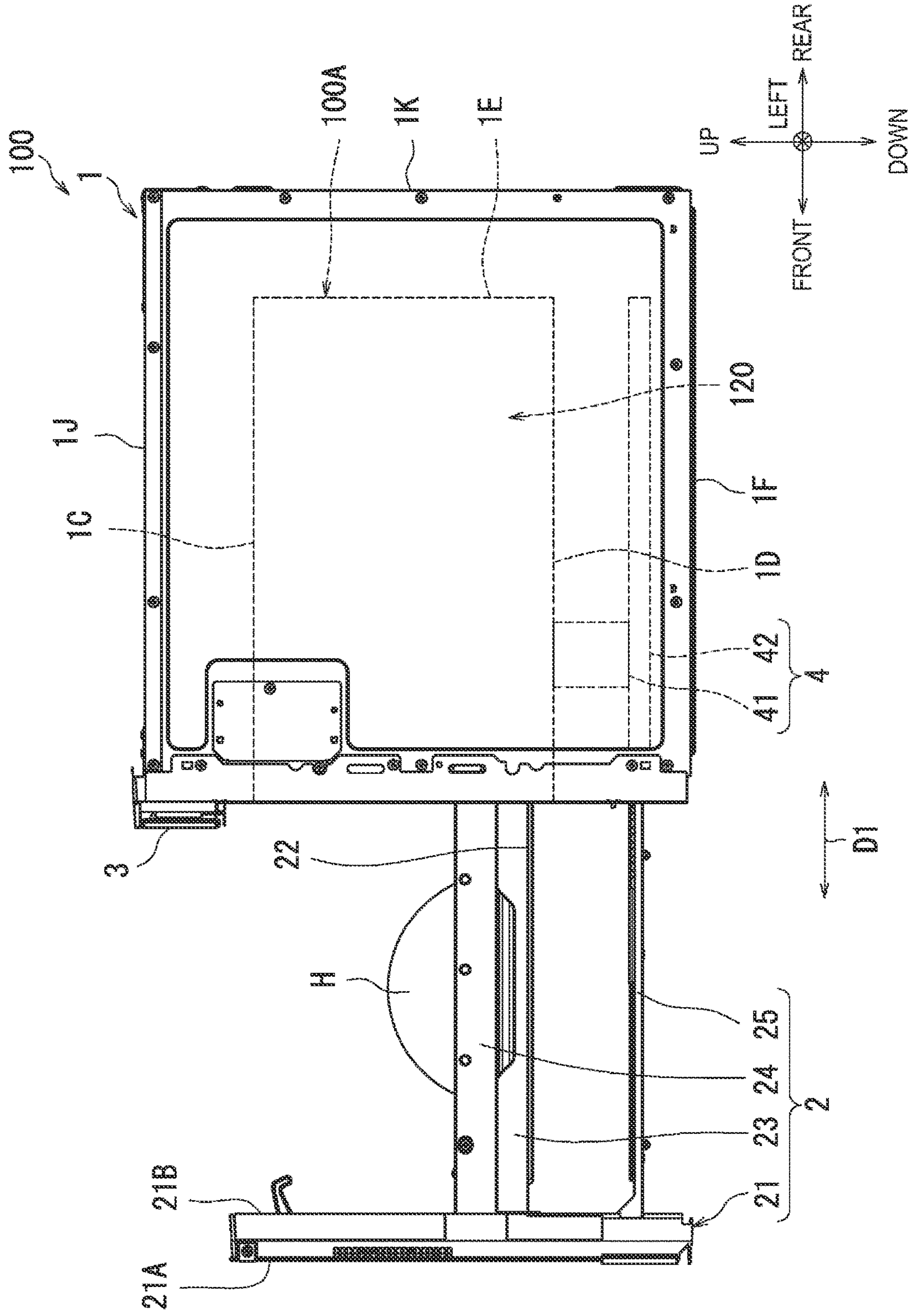
FIG. 2 is a right side view illustrating the pull-out heating cooking apparatus according to the present embodiment.
Figure 3:
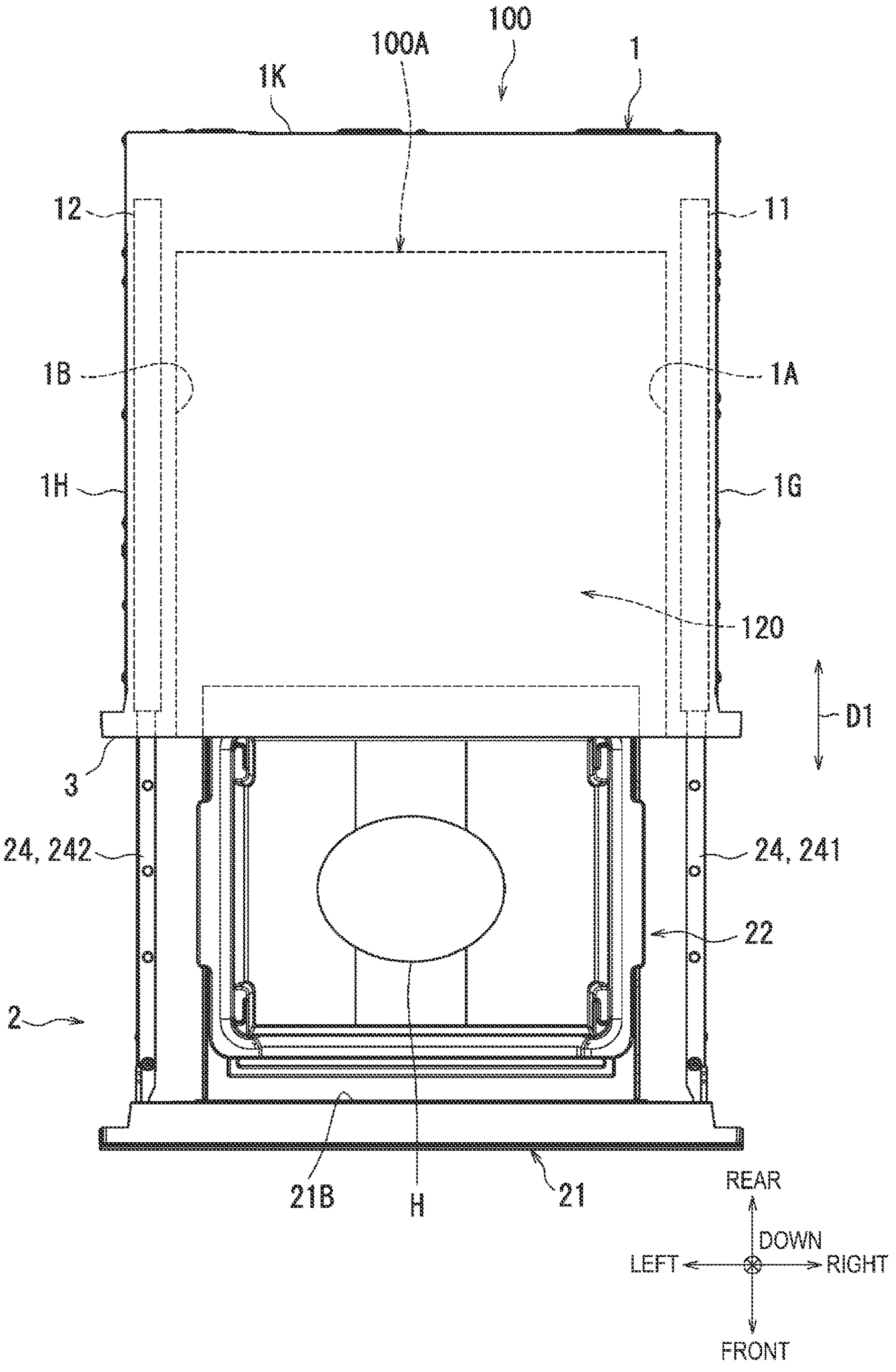
FIG. 3 is a top view illustrating the pull-out heating cooking apparatus according to the present embodiment.

A pull-out heating cooking apparatus 100 according to the present embodiment will be described with reference to FIG. 1 to FIG. 3. FIG. 1 is a perspective view illustrating an appearance of the pull-out heating cooking apparatus 100 according to the present embodiment. FIG. 2 is a right side view illustrating the pull-out heating cooking apparatus 100 according to the present embodiment. FIG. 3 is a top view illustrating the pull-out heating cooking apparatus 100 according to the present embodiment. More specifically, FIG. 1 to FIG. 3 illustrate the pull-out heating cooking apparatus 100 in a state where a pull-out body 2 is pulled out. Further, FIG. 1 illustrates the appearance of the pull-out heating cooking apparatus 100 when viewed from above obliquely from the right. The pull-out heating cooking apparatus 100 is one example of a heating cooking apparatus.

The pull-out heating cooking apparatus 100 heats and cooks an object H to be heated. The object H to be heated is, for example, a food product. As illustrated in FIG. 1, the pull-out heating cooking apparatus 100 includes a heating chamber 1, the pull-out body 2, an operation panel 3, a control unit 5, and a storage unit 6.

In the present embodiment, a side on which the operation panel 3 of the pull-out heating cooking apparatus 100 is disposed is defined as a front side of the pull-out heating cooking apparatus 100, and a side opposite to the front side is defined as a rear side of the pull-out heating cooking apparatus 100. Further, a right side of the pull-out heating cooking apparatus 100 when the pull-out heating cooking apparatus 100 is viewed from the front side is defined as a right side, and a side opposite to the right side is defined as a left side of the pull-out heating cooking apparatus 100. Further, in a direction orthogonal to a front-rear direction and a left-right direction of the pull-out heating cooking apparatus 100, a side on which the operation panel 3 is disposed is defined as an upper side of the pull-out heating cooking apparatus 100, and a side opposite to the upper side is defined as a lower side of the pull-out heating cooking apparatus 100. Note that these orientations do not limit the orientation of the pull-out heating cooking apparatus according to the present invention when in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 also includes a heating cooking chamber 100A therein.

The heating cooking chamber 100A includes an accommodation space 120 that accommodates the object H to be heated. The accommodation space 120 is a space that can accommodate the object to be heated H and has a predetermined volume. Specifically, the heating cooking chamber 100A includes a right wall 1A, a left wall 1B, a top wall 1C, a bottom wall 1D, and a back wall 1E. The shape of the heating cooking chamber 100A is, for example, a substantially rectangular parallelepiped shape. Materials of the right wall 1A, the left wall 1B, the top wall 1C, the bottom wall 1D, and the back wall 1E are, for example, a metal. The front side of the heating cooking chamber 100A is opened for allowing the object to be heated H to be inserted and removed.

The heating chamber 1 further includes a space between the bottom wall 1D and the bottom outer wall 1F. The heating chamber 1 further includes a space between the right wall 1A and the right outer wall 1G. The heating chamber 1 further includes a space between the left wall 1B and the left outer wall 1H. The heating chamber 1 further includes a space between the top wall 1C and the top outer wall 1J. The heating chamber 1 further includes a space between the back wall 1E and the back outer wall 1K.

The operation panel 3 includes an operation unit and a display portion. The operation unit receives an operation from a user. The operation unit includes various types of keys. The display portion displays various pieces of information. The display portion includes a liquid crystal panel. The operation panel 3 is located on an upper portion of a front face of the heating chamber 1.

The storage unit 6 includes a random access memory (RAM) and a read only memory (ROM). The storage unit 6 stores control programs used for controlling operations of each part of the pull-out heating cooking apparatus 100. The storage unit 6 stores setting information input when the operation panel 3 is operated.

The control unit 5 is a hardware circuit that includes a processor such as a central processing unit (CPU). The control unit 5 executes a control program stored in the storage unit 6.

Figure 4:
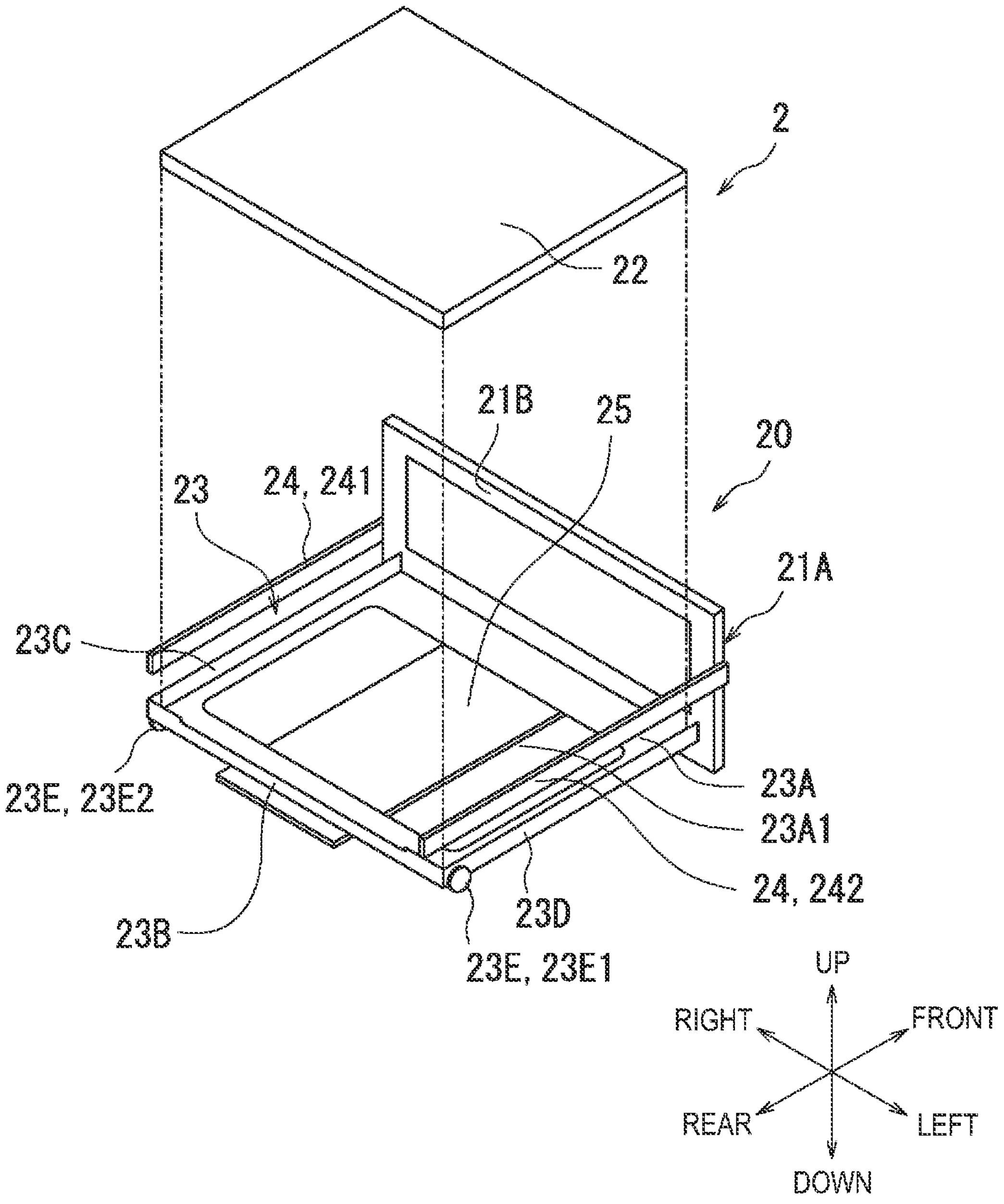
FIG. 4 is a perspective view of a pull-out body and a placing portion according to the present embodiment.

Subsequently, the pull-out body 2 and a placing portion 22 according to the present embodiment will be described with reference to FIG. 1 to FIG. 4. FIG. 4 is a perspective view of the pull-out body 2 and the placing portion 22 according to the present embodiment. As illustrated in FIG. 1 to FIG. 4, the pull-out heating cooking apparatus 100 further includes the placing portion 22. In addition, as illustrated in FIG. 1 to FIG. 4, the pull-out body 2 is freely pulled out from the heating cooking chamber 100A along a predetermined direction D1. The predetermined direction D1 is a direction along a front-rear direction. More specifically, the pull-out body 2 can be pulled out and pulled in with respect to the heating chamber 1. Specifically, the pull-out body 2 includes a pull-out main body 20. The pull-out main body 20 includes a door portion 21 and a support portion 23.

The object H to be heated can be placed on the placing portion 22. The placing portion 22 is, for example, a plate-like member made of a ceramic, glass, or a synthetic resin, and is preferably a plate-like member made of a ceramic or glass. As a result, the placing portion 22 transmits microwaves. In addition, the placing portion 22 is transparent or translucent. The term "translucent" includes color transparency.

The door portion 21 can open and close an opening on the front side of the heating cooking chamber 100A. The door portion 21 is a substantially rectangular plate-like member. The door portion 21 includes a front face 21A and a rear face 21B. The door portion 21 opens the opening on the front side of the heating cooking chamber 100A in a state where the pull-out body 2 is pulled out of the heating cooking chamber 100A. The door portion 21 closes the opening on the front side of the heating cooking chamber 100A in a state where the pull-out body 2 is pulled into the heating cooking chamber 100A. Meanwhile, in a state where the pull-out body 2 is pushed into the heating cooking chamber 100A, a distance between the top wall 1C and the bottom wall 1D is shorter than a distance between the back wall 1E and the rear face 21B.

The support portion 23 is fixed to the rear face 21B of the door portion 21, and supports a peripheral portion of the placing portion 22 such that the placing portion 22 is held in a horizontal state. Specifically, the support portion 23 includes a base plate portion 23A, a back plate portion 23B, a right plate portion 23C, a left plate portion 23D, and a pair of rollers 23E.

The base plate portion 23A includes a rectangular opening 23A1. The rectangular opening 23A1 is positioned at a substantially center portion of the base plate portion 23A.

The back plate portion 23B, the right plate portion 23C, and the left plate portion 23D are erected upward from a peripheral portion of the base plate portion 23A. The placing portion 22 is fitted between the door portion 21, the back plate portion 23B, the right plate portion 23C, and the left plate portion 23D. In addition, the peripheral portion of the placing portion 22 is fixed to the upper face of the peripheral portion of the base plate portion 23A.

The pair of rollers 23E are rotated as the pull-out body 2 moves. Specifically, the pair of rollers 23E include a right roller 23E1 and a left roller 23E2. In addition, the right roller 23E1 is attached to a rear end of the right plate portion 23C. The left roller 23E2 is attached to a rear end of the left plate portion 23D.

The placing portion 22 and the support portion 23 are pulled out of the heating cooking chamber 100A to the outside by pulling out the pull-out body 2. The placing portion 22 and the support portion 23 are accommodated in the heating cooking chamber 100A in a state where the pull-out body 2 is pulled in. As described above, the placing portion 22 is transparent or translucent, and thus a user or the like can visually recognize an object present below the placing portion 22. As a result, the user or the like can easily clean the bottom wall 1D when the bottom wall 1D of the heating cooking chamber 100A is dirty. In addition, an object H to be heated that has fallen onto the bottom wall 1D can be removed before carbonization.

The pull-out body 2 further includes a pair of slide members 24 and a support member 25 in addition to the pull-out main body 20.

Further, the pair of slide members 24 regulate the movement direction of the pull-out body 2 in the front-rear direction. The pair of slide members 24 are fixed to the rear face 21B of the door portion 21.

Specifically, the pair of slide members 24 includes a right slide member 241 and a left slide member 242. Each of the right slide member 241 and the left slide member 242 is, for example, a member having the front-rear direction as a longitudinal direction. The right slide member 241 and the left slide member 242 oppose each other in the left-right direction. One end portion of the right slide member 241 is attached to a right edge portion of the rear face 21B of the door portion 21. One end portion of the left slide member 242 is attached to a left edge portion of the rear face 21B of the door portion 21.

Meanwhile, the heating chamber 1 further includes a right slide rail 11 and a left slide rail 12. The right slide rail 11 is fixed in a space between the right wall 1A and the right outer wall 1G. The left slide rail 12 is fixed in a space between the left wall 1B and the left outer wall 1H. Each of the right slide rail 11 and the left slide rail 12 is a member having the front-rear direction as a longitudinal direction. The right slide member 241 is supported to be slidable along the right slide rail 11. The left slide member 242 is supported to be slidable along the left slide rail 12.

The support member 25 supports the pull-out main body 20. More specifically, the support member 25 regulates the movement direction of the pull-out body 2 in the predetermined direction D1. One end portion of the support member 25 is attached at a center portion in the left-right direction of the rear face 21B of the door portion 21 and below the placing portion 22. The support member 25 is, for example, a plate-like member having the front-rear direction as a longitudinal direction. The support member 25 includes a rack portion. The rack portion includes a plurality of teeth. The support member 25 may be a single plate-like member or a plurality of plate-like members.

Meanwhile, the heating chamber 1 further includes a drive mechanism 4. The drive mechanism 4 drives the support member 25. The drive mechanism 4 is positioned below the heating cooking chamber 100A. Specifically, the drive mechanism 4 is accommodated in a space between the bottom wall 1D and the bottom outer wall 1F. For example, the drive mechanism 4 includes a drive motor 41, a pinion, and a drive rail 42. The drive rail 42 is fixed in a space between the bottom wall 1D and the bottom outer wall 1F. The drive rail 42 is a member having the front-rear direction as a longitudinal direction. The support member 25 is supported to be slidable along the drive rail 42. The pinion is attached to a tip end portion of the drive motor 41. The pinion engages with the rack portion of the support member 25. Furthermore, the support member 25 moves in the front-rear direction when the pinion rotates. As a result, the pull-out body 2 is in an open state or a closed state. Note that the drive mechanism 4 may drive at least one of the support member 25, the right slide member 241, and the left slide member 242. Further, in a case where the right slide member 241 and the left slide member 242 are driven, the drive mechanism 4 may be positioned on the side of the heating cooking chamber 100A.

As described above, the placing portion 22 is transparent or translucent, and thus a user or the like can visually recognize the support member 25 that is present below the placing portion 22. As a result, a manufacturer and the like can easily insert the support member 25 into the drive rail 42 provided at the lower center on the front face side of the heating chamber 1 in order to align the support member 25 and the pinion.

Figure 5:
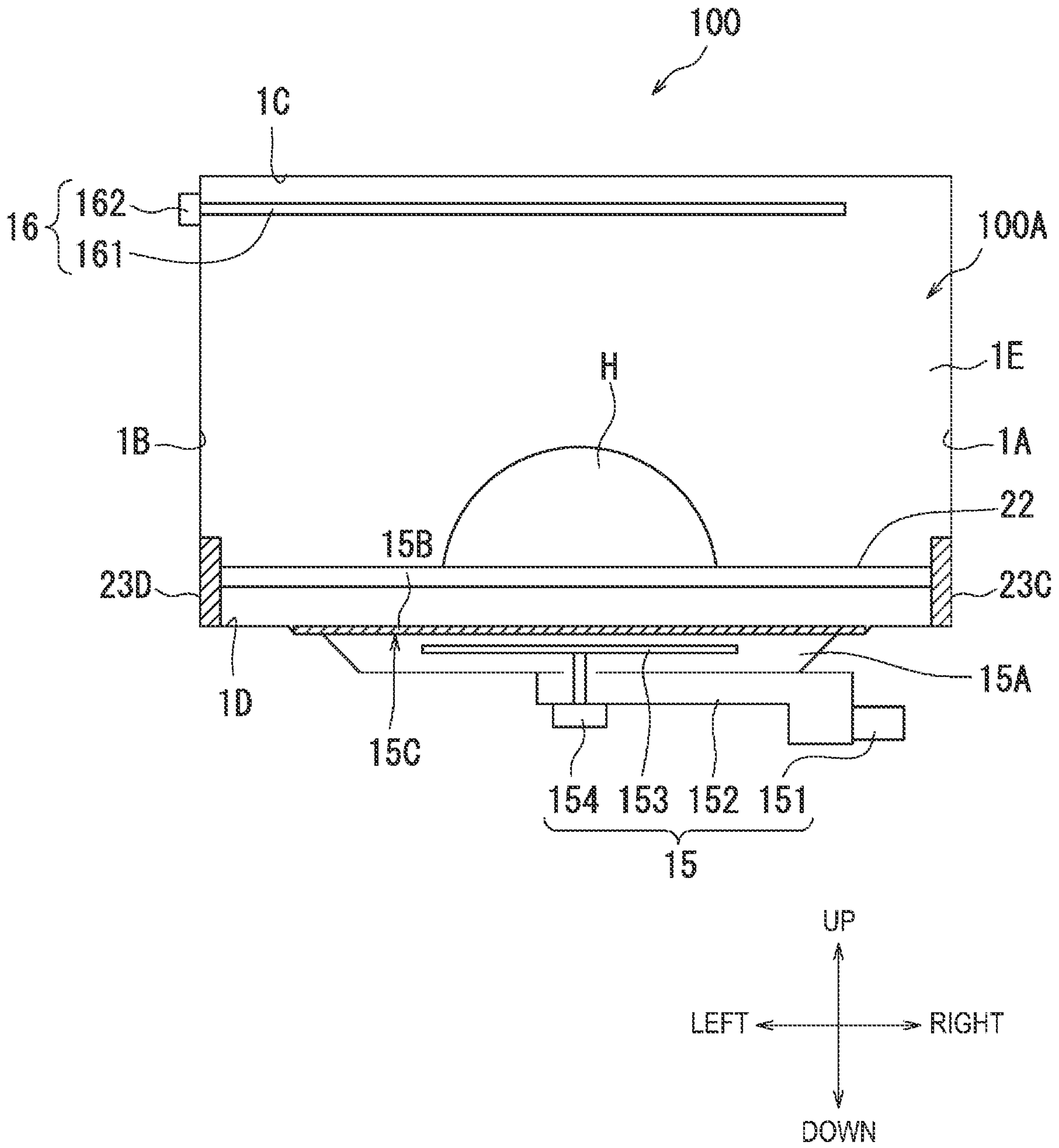
FIG. 5 is a diagram illustrating a schematic cross section of a heating chamber according to the present embodiment.
Figure 6:
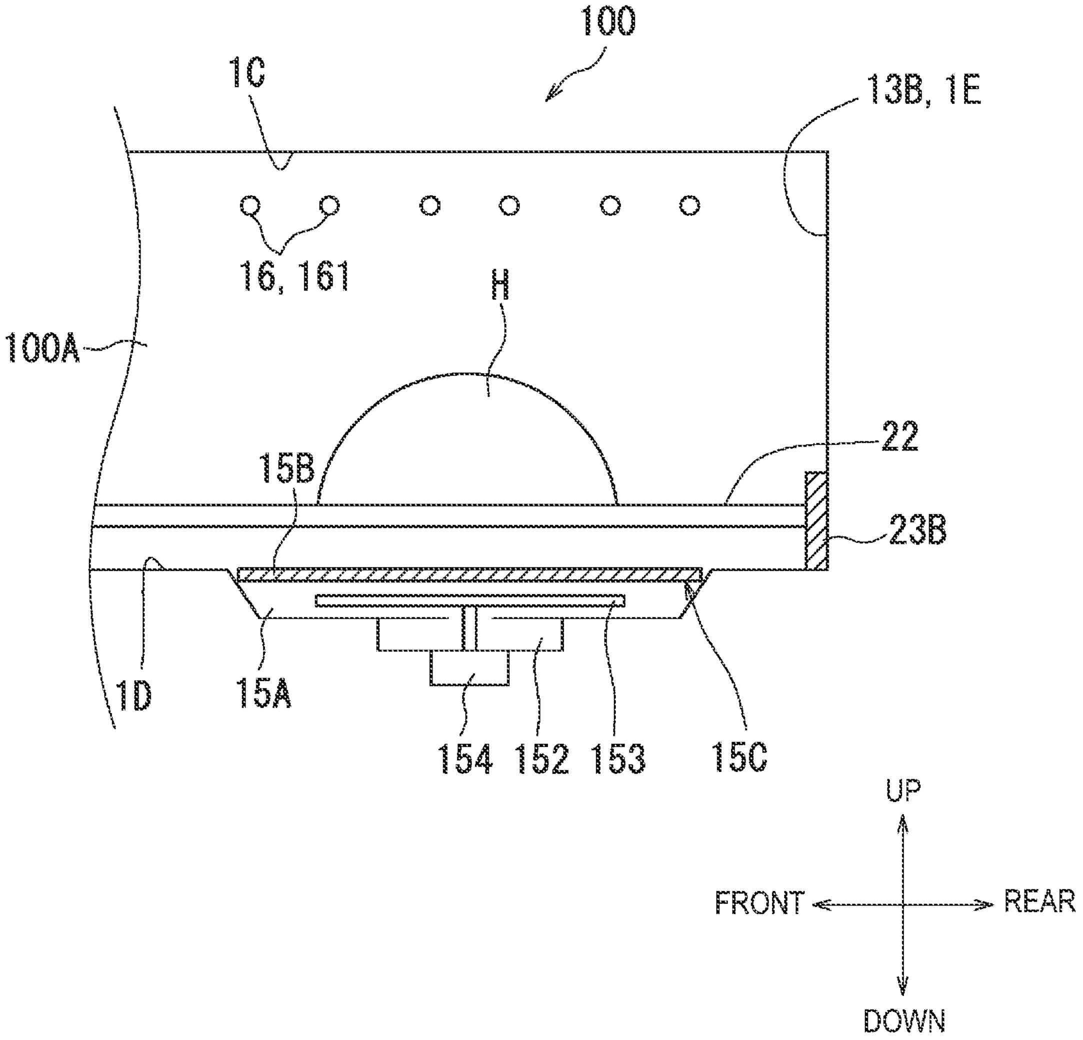
FIG. 6 is a diagram illustrating a schematic cross section of the heating chamber according to the present embodiment.

Next, the heating chamber 1 according to the present embodiment will be further described with reference to FIG. 1 to FIG. 6. FIG. 5 and FIG. 6 are diagrams illustrating a schematic cross section of the heating chamber 1 according to the present embodiment. More specifically, FIG. 5 illustrates a cross section of the heating chamber 1 taken along a plane orthogonal to the front-rear direction. FIG. 6 illustrates a cross section of the heating chamber 1 taken along a plane orthogonal to the left-right direction.

As illustrated in FIG. 5 and FIG. 6, the pull-out heating cooking apparatus 100 further includes a microwave supply unit 15 and a partitioning member 15B. The microwave supply unit 15 supplies microwaves to the heating cooking chamber 100A.

The microwave supply unit 15 is positioned outside of the heating cooking chamber 100A via the bottom wall 1D. The microwave supply unit 15 includes a radiation chamber 15A, a magnetron 151, a waveguide 152, a rotary antenna 153, and an antenna motor 154. The magnetron 151 generates microwaves. The waveguide 152 propagates the microwaves generated by the magnetron 151 to the radiation chamber 15A.

The radiation chamber 15A includes a radiation port 15C. The radiation port 15C has, for example, a square shape. In addition, the radiation port 15C is positioned below the heating cooking chamber 100A. Specifically, the radiation port 15C is positioned at a substantially center portion of the bottom wall 1D. The rotary antenna 153 is accommodated in the radiation chamber 15A. The antenna motor 154 drives the rotary antenna 153. The rotary antenna 153 agitates microwaves and supplies the microwaves to the heating cooking chamber 100A through the radiation port 15C.

As described above, the microwave supply unit 15 is provided below the heating cooking chamber 100A, and thus the object H to be heated can be irradiated with microwaves generated by the microwave supply unit 15 at a short distance. As a result, the object H to be heated can be efficiently heated.

The partitioning member 15B covers the radiation port 15C. The partitioning member 15B need only have a shape that can cover the radiation port 15C. The partitioning member 15B is preferably a plate-like member. Further, when viewed from the vertical direction, the shape of the partitioning member 15B is, for example, a square shape.

The material of the partitioning member 15B includes a ceramic or glass. As a result, because the material of the partitioning member 15B includes a ceramic or glass, the partitioning member 15B transmits microwaves. On the other hand, the materials of the radiation chamber 15A and the waveguide 152 include a metal.

The pull-out heating cooking apparatus 100 further includes a grill unit 16. Specifically, the grill unit 16 includes a heater 161 and an energization unit 162. The heater 161 is positioned in the heating cooking chamber 100A and heats the object H to be heated. Specifically, the heater 161 is positioned at an upper portion in the heating cooking chamber 100A. The heater 161 has substantially a U shape when viewed from a vertical direction. In the present embodiment, three grill units 16 are disposed. The heater 161 is, for example, a sheathed heater. The energization unit 162 is positioned outside of the left wall 1B. The energization unit 162 energizes the heater 161. The energized heater 161 generates heat.

According to the pull-out heating cooking apparatus 100 of the present invention, the heater 161 is provided in an upper portion of the heating cooking chamber 100A, and the microwave supply unit 15 is provided below the heating cooking chamber 100A. Thus, the heater 161 does not inhibit an object H to be heated from being irradiated with microwaves and conducts heat generated by the heater 161 to an upper face of the object H to be heated, and thus the upper face of the object H to be heated can be efficiently heated.

Figure 7:
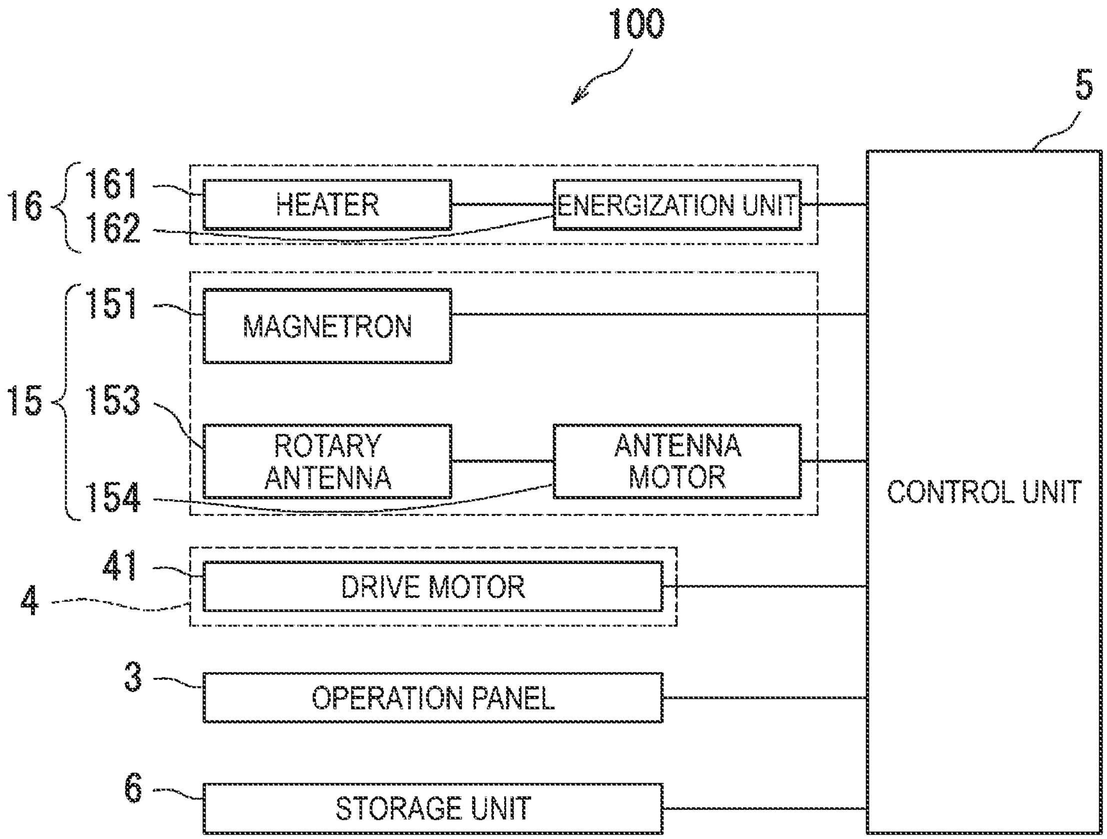
FIG. 7 is a block diagram illustrating a configuration of the pull-out heating cooking apparatus according to the present embodiment.

A configuration of the pull-out heating cooking apparatus 100 will be described in detail with reference to FIG. 7. FIG. 7 is a block diagram illustrating a configuration of the pull-out heating cooking apparatus 100 according to the present embodiment.

In the present embodiment, the pull-out heating cooking apparatus 100 has a "microwave heating mode" and a "grill heating mode" as heating cooking modes. The "microwave heating mode" is mainly a mode in which the object H to be heated is heated and cooked by radiating microwaves into the heating cooking chamber 100A. The "grill heating mode" is mainly a mode in which the object H to be heated is heated and cooked by conducting heat generated by the heater 161 to the object H to be heated.

The control unit 5 controls a drive unit 133, the magnetron 151, the antenna motor 154, the energization unit 162, the drive motor 41, the operation panel 3, and the storage unit 6 by executing control programs stored in the storage unit 6.

More specifically, the control unit 5 controls the driving of the microwave supply unit 15 and the driving of the grill unit 16. For example, in a case where the "microwave heating mode" is selected, the control unit 5 drives the magnetron 151 and the antenna motor 154. Further, in a case where the "grill heating mode" is selected, the control unit 5 energizes the energization unit 162.

Figure 8:
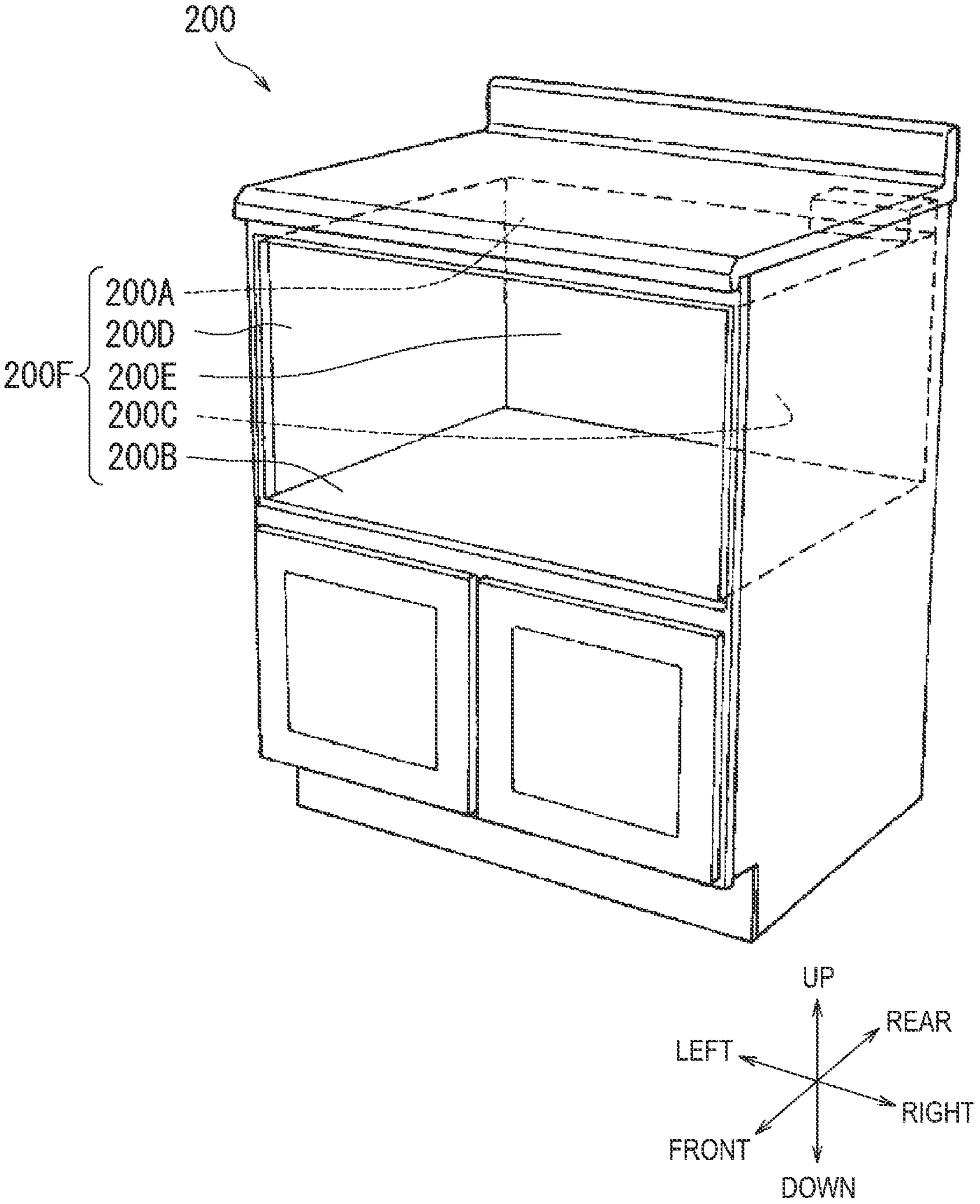
FIG. 8 is a diagram illustrating an appearance of a cabinet in which the pull-out heating cooking apparatus according to the present embodiment is built.

Next, a cabinet 200 to which the pull-out heating cooking apparatus 100 is attached will be described with reference to FIG. 8. FIG. 8 is a diagram illustrating an appearance of the cabinet 200 to which the pull-out heating cooking apparatus 100 according to the present embodiment is attached.

The pull-out heating cooking apparatus 100 is installed in the cabinet 200 in built-in manner. As illustrated in FIG. 8, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space in which the pull-out heating cooking apparatus 100 is attached.

An embodiment of the present invention has been described above with reference to the drawings. However, the present invention is not limited to the embodiment described above, and the present invention can be implemented in various modes without departing from the gist of the disclosure. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limiting, and various modifications can be made within the scope not departing from the effects of the present invention in essence.

Figure 9:
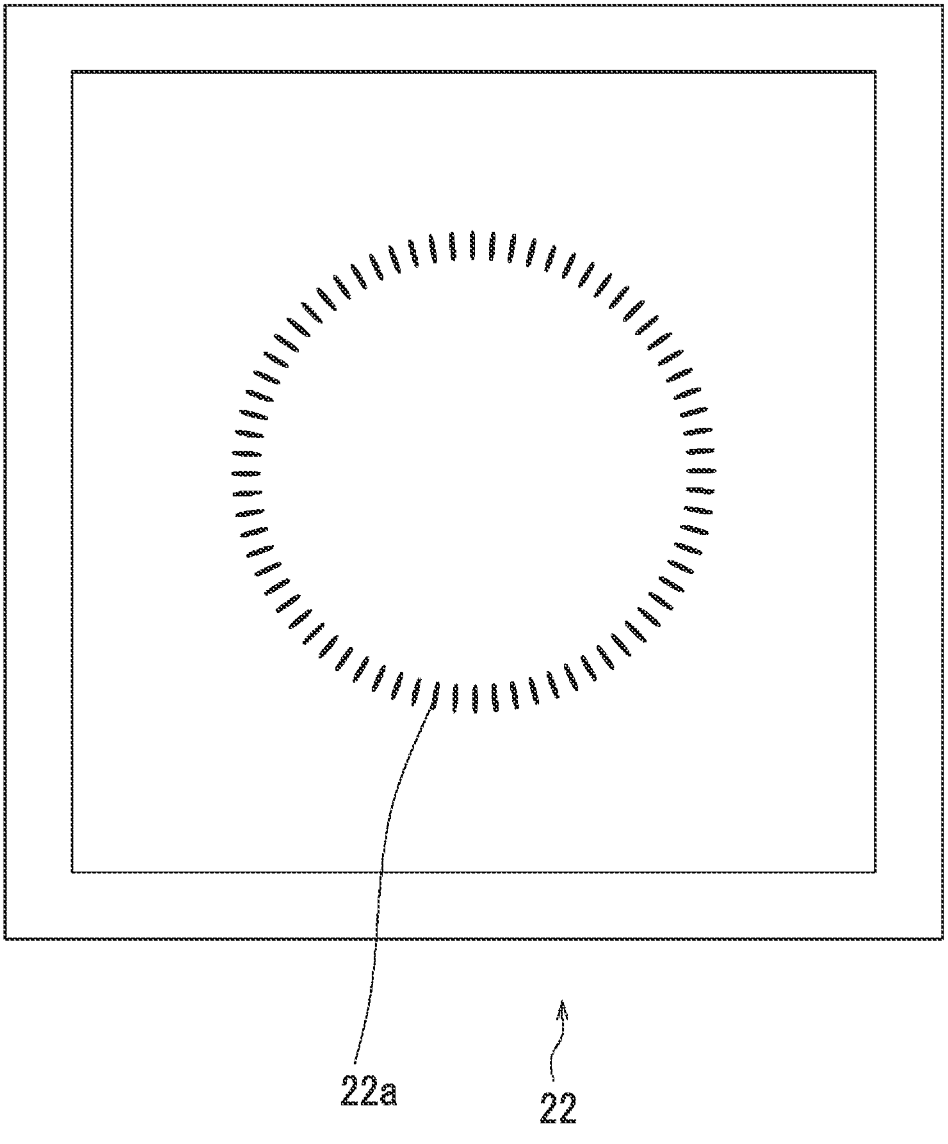
FIG. 9 is a bottom view of the placing portion according to the present embodiment.

(1) As described with reference to FIG. 1 to FIG. 8, the placing portion 22 is transparent or translucent, but the present invention is not limited thereto. Position information may be provided on the lower face of the transparent or translucent placing portion 22. FIG. 9 is a bottom view of the placing portion 22 according to the present embodiment. Position information is provided on the lower face of the placing portion 22. The position information indicates the position at which the object H to be heated is to be placed. The position information is, for example, a mark 22*a*. The shape of the mark 22*a* is, for example, a circular ring. For example, the mark 22*a* is printed on the lower face of the placing portion 22. As described above, the microwave supply unit 15 is provided below the heating cooking chamber 100A and can emit microwaves at a short distance. Further, the object H to be heated can be more efficiently heated by providing the mark 22*a* for guiding the object H to be heated to a point which is most efficiently irradiated with microwaves. In addition, the mark 22*a* is provided on the lower face of the placing portion 22 because the placing portion 22 is transparent or translucent, and thus the mark 22*a* hardly becomes dirty and can be prevented from wearing off.

(2) As described with reference to FIG. 1 to FIG. 9, the pull-out heating cooking apparatus 100 may further include an air sending unit that supplies hot air to the heating cooking chamber 100A.

(3) As described with reference to FIG. 1 to FIG. 9, the pull-out heating cooking apparatus 100 includes the grill unit 16, but the present invention is not limited thereto. The pull-out heating cooking apparatus 100 may not include the grill unit 16.

(4) As described with reference to FIG. 1 to FIG. 9, the placing portion 22 is fixed onto the base plate portion 23A of the support portion 23, but the present invention is not limited thereto. For example, the placing portion 22 may be detachably placed on the support portion 23, or may be placed on the partitioning member 15B.

INDUSTRIAL APPLICABILITY

The present invention is useful in the field of a heating cooking apparatus, for example.

REFERENCE SIGNS LIST

1 Heating chamber
2 Pull-out body
4 Drive mechanism
15 Microwave supply unit
15B Partitioning member
15C Radiation port
21 Door portion
22 Placing portion
23 Support portion
25 Support member
100 Pull-out heating cooking apparatus
100A Heating cooking chamber

The invention claimed is:

1. A pull-out heating cooking apparatus comprising:
a heating cooking chamber configured to accommodate an object to be heated;
a microwave supply unit including a radiation port and configured to supply microwaves to the heating cooking chamber through the radiation port;
a partitioning member configured to cover the radiation port;
a placing portion on which the object to be heated is placed; and
a pull-out body configured to be freely pulled out of the heating cooking chamber in a predetermined direction,
wherein the radiation port is positioned at a bottom wall of the heating cooking chamber,
the pull-out body includes:
a door portion that is capable of opening and closing the heating cooking chamber, and
a support portion that is fixed to the door portion and that supports the placing portion,
the partitioning member and the placing portion transmit the microwaves,
the support portion has an opening at a position opposite the partitioning member, and the microwaves supplied through the radiation port are transmitted through the partitioning member and the placing portion covering the opening to heat the object to be heated.

2. The pull-out heating cooking apparatus according to claim 1, wherein the placing portion is transparent or translucent, and position information indicating a position at which the object to be heated is to be placed is provided on a lower face of the placing portion.

3. The pull-out heating cooking apparatus according to claim 1, further comprising:

a heater positioned in the heating cooking chamber and configured to heat the object to be heated, wherein the heater is positioned at an upper portion of the heating cooking chamber.

4. The pull-out heating cooking apparatus according to claim 1, wherein the pull-out body further includes a support member that is fixed to the door portion and that is supported to be slidable along a rail provided at a lower center on a front face side of the heating cooking chamber.

5. The pull-out heating cooking apparatus according to claim 4, wherein the placing portion is transparent or translucent, and the support member is configured to be visually recognizable through the placing portion and the opening of the support portion in a state that the placing portion is pulled out of the heating cooking chamber together with the pull-out body.

* * * * *